United States Patent
Driesen et al.

(10) Patent No.: US 9,026,502 B2
(45) Date of Patent: May 5, 2015

(54) FEEDBACK OPTIMIZED CHECKS FOR DATABASE MIGRATION

(71) Applicants: Volker Driesen, Walldorf (DE); Christoph Luettge, Muehltal (DE); Andreas Jahr, Karlsruhe (DE)

(72) Inventors: Volker Driesen, Walldorf (DE); Christoph Luettge, Muehltal (DE); Andreas Jahr, Karlsruhe (DE)

(73) Assignee: SAP SE, Walldorf (DE)

( * ) Notice: Subject to any disclaimer, the term of this patent is extended or adjusted under 35 U.S.C. 154(b) by 212 days.

(21) Appl. No.: 13/926,201

(22) Filed: Jun. 25, 2013

(65) Prior Publication Data

US 2014/0379669 A1 Dec. 25, 2014

(51) Int. Cl.
*G06F 17/30* (2006.01)

(52) U.S. Cl.
CPC .................................. *G06F 17/303* (2013.01)

(58) Field of Classification Search
USPC .......................................................... 707/690
See application file for complete search history.

(56) References Cited

U.S. PATENT DOCUMENTS

| | | | |
|---|---|---|---|
| 7,133,984 B1 | 11/2006 | Dickensheets | |
| 7,293,040 B2 | 11/2007 | Terada | |
| 7,421,537 B2 | 9/2008 | Corrado | |
| 7,822,775 B2 | 10/2010 | Langer | |
| 7,991,742 B2 | 8/2011 | Li et al. | |
| 8,103,639 B1 | 1/2012 | Srinivasan et al. | |
| 8,108,365 B2 | 1/2012 | Mori et al. | |
| 8,280,853 B1 | 10/2012 | Lai et al. | |
| 8,301,589 B2 | 10/2012 | Sen et al. | |
| 8,615,579 B1 * | 12/2013 | Vincent et al. | 709/224 |
| 8,935,500 B1 * | 1/2015 | Gulati et al. | 711/165 |
| 2003/0084212 A1 | 5/2003 | Butterfield | |
| 2004/0083477 A1 * | 4/2004 | Acharya et al. | 718/102 |
| 2006/0112219 A1 | 5/2006 | Chawla et al. | |
| 2007/0220071 A1 * | 9/2007 | Anzai et al. | 707/204 |
| 2008/0147945 A1 * | 6/2008 | Zimmer et al. | 710/260 |
| 2008/0235300 A1 | 9/2008 | Nemoto et al. | |
| 2008/0294648 A1 | 11/2008 | Lin et al. | |
| 2009/0228589 A1 * | 9/2009 | Korupolu | 709/226 |
| 2009/0271596 A1 * | 10/2009 | Barsness et al. | 712/229 |
| 2011/0066593 A1 | 3/2011 | Ahluwalia et al. | |
| 2011/0071876 A1 * | 3/2011 | Fong et al. | 705/8 |
| 2011/0099550 A1 * | 4/2011 | Shafi | 718/102 |
| 2011/0131568 A1 * | 6/2011 | Heim | 718/1 |
| 2011/0145380 A1 * | 6/2011 | Glikson et al. | 709/223 |
| 2011/0191558 A1 * | 8/2011 | Anderson et al. | 711/162 |
| 2012/0041933 A1 | 2/2012 | Driesen | |
| 2012/0239859 A1 * | 9/2012 | Lary et al. | 711/103 |
| 2012/0254175 A1 * | 10/2012 | Horowitz et al. | 707/737 |
| 2012/0254269 A1 * | 10/2012 | Carmichael | 707/827 |
| 2012/0265726 A1 | 10/2012 | Padmanabhan et al. | |
| 2012/0303913 A1 * | 11/2012 | Kathmann et al. | 711/162 |

\* cited by examiner

*Primary Examiner* — Cam-Linh Nguyen

(74) *Attorney, Agent, or Firm* — Schwegman Lundberg & Woessner, P.A.

(57) ABSTRACT

Example systems and methods of database migration optimized by feedback are presented. In one example, a migration of database data from a first to a second database by multiple concurrent processes may be initiated on a computing system. Processing time of at least some of the processes may be monitored during the migration. Based on this monitoring, at least one portion of the database data being migrated by one of the concurrent processes may be segmented into multiple segments, wherein each of the multiple segments may be migrated by a separate one of the concurrent processes. Also, a load on the computing system may be monitored during the migration. Based on this monitoring, a number of the concurrent processes may be adjusted. In other examples, consistency checking for subsequent database migrations may be based on consistency checking results for the current migration.

20 Claims, 7 Drawing Sheets

FEEDBACK OPTIMIZED CHECKS FOR DATABASE MIGRATION

FIELD

This application relates generally to computer database technology and, in an example embodiment, to feedback-optimized database migration.

BACKGROUND

Database migration is the moving of database data from one database to another, typically involving some format change or other modification in at least some of the data. Such migration may be performed for a number of reasons. For example, different database applications may store the same types of data differently in database tables, so transitioning from one database application to another may necessitate a migration of database data to a format usable by the newer database application. In another example, upgrading a database application from an older version to a newer version may also involve changes in the way particular types of data are stored in the database, thus causing a similar migration to be undertaken. Even if a customer continues to employ a particular version of a database application over a long period of time, a change in operating system, computer system hardware, or other aspect of the computing environment may result in a nontrivial database migration that involves changes in data format and other aspects of the database. Generally, database and other software providers have made available a number of migration tools to address a variety of migration needs and environments.

Customers generally consider two characteristics of the migration process to be of primary importance. At the least, the migration is to result in data consistency, in which the database data after the migration represents the same data as the database data prior to the migration. Data consistency is often proven, at least to some degree, by way of a number of consistency checks executed during and/or after the migration. In addition, the migration process is often at least partially executed during a downtime of the database application, during which the database data is unavailable for customer use. As a result, customers often consider the speed at which the migration progresses, including any associated consistency checking, to be of particular importance.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
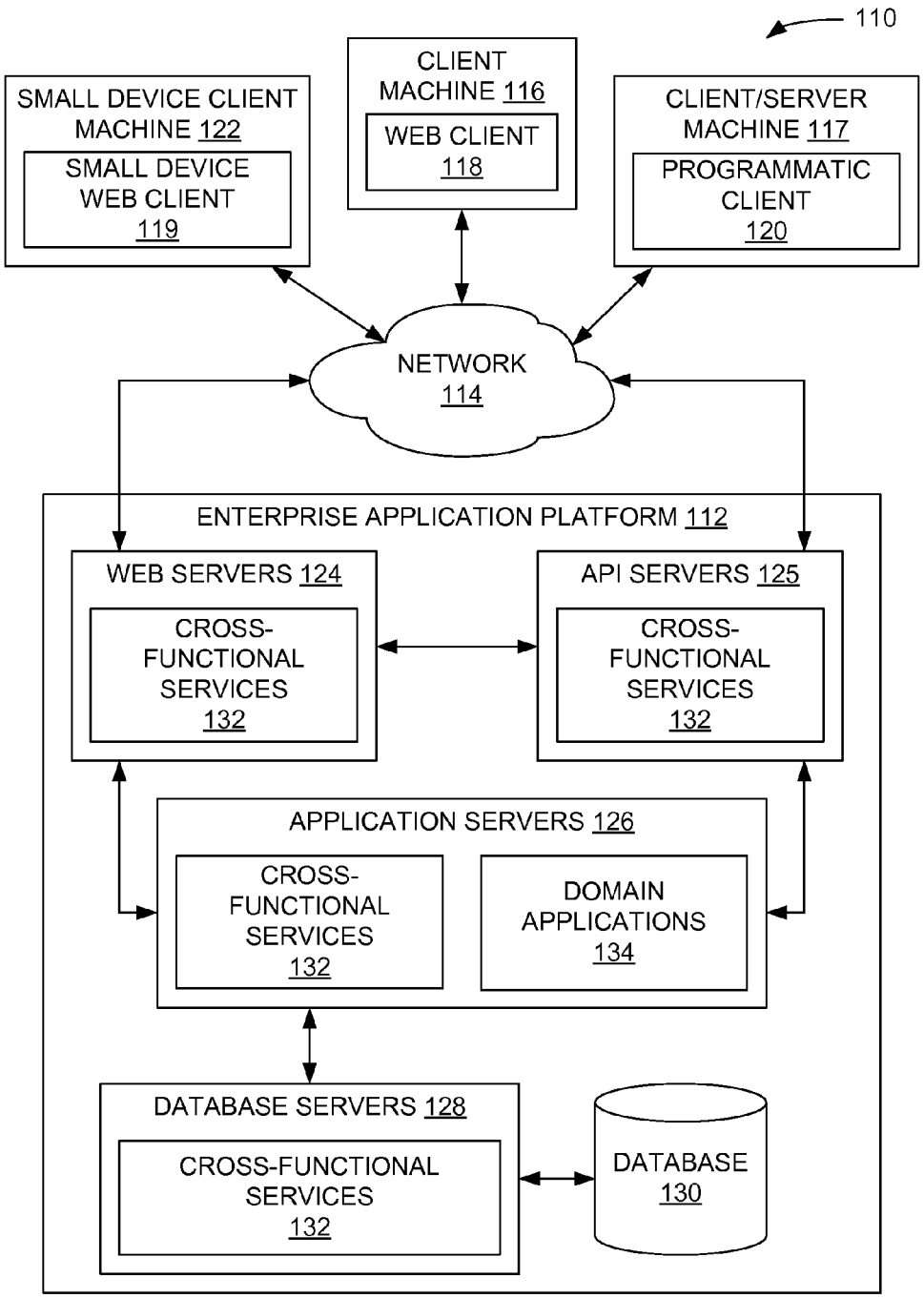
FIG. 1 is a block diagram of an example system having a client-server architecture for an enterprise application platform capable of employing the systems and methods described herein.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to one or more clients. FIG. 1 illustrates, for example, a client machine 116 with a web client 118 (e.g., a browser, such as the Internet Explorer® browser developed by Microsoft® Corporation), a small device client machine 122 with a small device web client 119 (e.g., a browser without a script engine), and a client/server machine 117 with a programmatic client 120.

Turning specifically to the enterprise application platform 112, web servers 124 and application program interface (API) servers 125 are coupled to, and provide web and programmatic interfaces to, application servers 126. The application servers 126 are, in turn, shown to be coupled to one or more database servers 128, which may facilitate access to one or more databases 130. The web servers 124, API servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client machine 116, the client/server machine 117, and the small device client machine 122. In addition, the cross-functional services 132 may provide an environment for delivering enhancements to existing applications and for integrating third-party and legacy applications with existing cross-functional services 132 and domain applications 134. Further, while the system 110 shown in FIG. 1 employs a client-server architecture, the present disclosure is, of course, not limited to such an architecture, and could equally well find application in a distributed or peer-to-peer architecture system.

Figure 2:
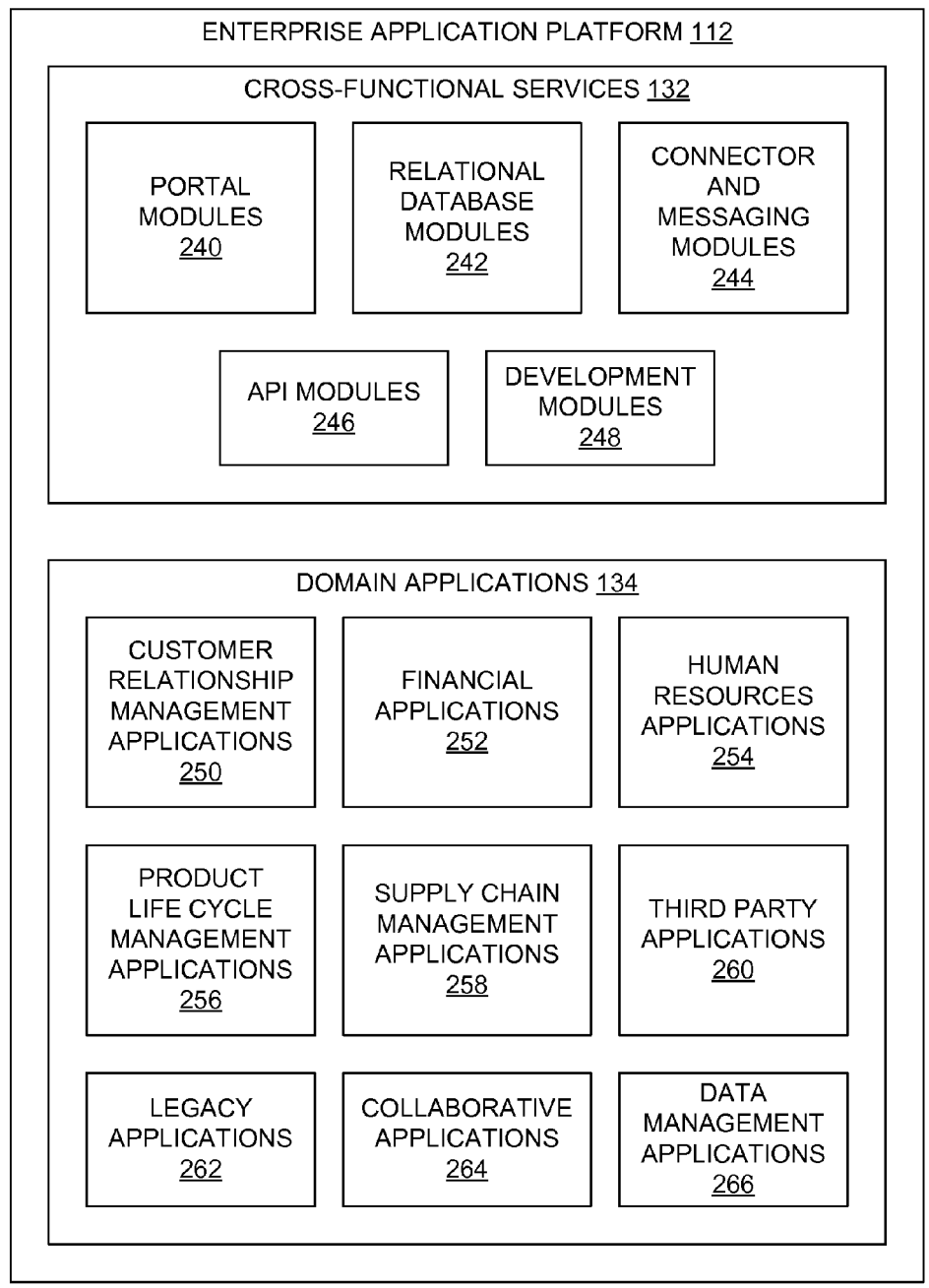
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244, API modules 246, and development modules 248.

The portal modules 240 may enable a single point of access to other cross-functional services 132 and domain applications 134 for the client machine 116, the small device client machine 122, and the client/server machine 117 of FIG. 1. The portal modules 240 may be utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 240 may include, in one implementation, a generation module, a communication module, a receiving module, and a regeneration module. In addition, the portal modules 240 may comply with web services standards and/or utilize a variety of Internet technologies, including, but not limited to, Java®, Java 2 Platform—Enterprise Edition (J2EE), SAP's Advanced Business Application Programming (ABAP®) Language and Web Dynpro, eXtensible Markup Language (XML), Java Connector Architecture (JCA), Java Authentication and Authorization Service (JAAS), X.509, Lightweight Directory Access Protocol (LDAP), Web Services Description Language (WSDL), WebSphere Service Registry and Repository (WSRR), Simple Object Access Protocol (SOAP), Universal Description, Discovery and Integration (UDDI), and Microsoft .NET.

The relational database modules 242 may provide support services that include a user interface library for access to the database 130 (FIG. 1). The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, Structured Query Language (SQL), SQL Database Connectivity (SQLDBC), Oracle®, MySQL, Unicode, Java Database Connectivity (JDBC), as well as logging of database operations performed by the user, enforcing of database user access permissions, and the like.

The connector and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The API modules 246 may enable the development of service-based applications by exposing an interface to existing and new applications as services. Repositories may be included in the platform 112 as a central place to find available services when building applications.

The development modules 248 may provide a development environment for the adding, integrating, updating, and extending of software components on the enterprise application platform 112 without impacting existing cross-functional services 132 and domain applications 134.

Turning to the domain applications 134, customer relationship management applications 250 may enable access to, and facilitate collecting and storing of, relevant personalized information from multiple data sources and business processes. Enterprise personnel who are tasked with developing a buyer into a long-term customer may utilize the customer relationship management applications 250 to provide assistance to the buyer throughout a customer engagement cycle.

Enterprise personnel may utilize financial applications 252 and business processes to track and control financial transactions within the enterprise application platform 112. The financial applications 252 may facilitate the execution of operational, analytical, and collaborative tasks that are associated with financial management. Specifically, the financial applications 252 may enable the performance of tasks related to financial accountability, planning, forecasting, and managing the cost of finance.

Human resources applications 254 may be utilized by enterprise personnel and business processes to manage, deploy, and track enterprise personnel. Specifically, the human resources applications 254 may enable the analysis of human resource issues and facilitate human resource decisions based on real-time information.

Product life cycle management applications 256 may enable the management of a product throughout the lifecycle of the product. For example, the product life cycle management applications 256 may enable collaborative engineering, custom product development, project management, asset management, and quality management among business partners.

Supply chain management applications 258 may enable monitoring of performances that are observed in supply chains. The supply chain management applications 258 may facilitate adherence to production plans and on-time delivery of products and services.

Third-party applications 260, as well as legacy applications 262, may be integrated with domain applications 134 and utilize cross-functional services 132 on the enterprise application platform 112.

Additionally, collaborative applications 264 may facilitate joint creation and modification of documents and other work product by multiple users, and data management applications 266 may enable data organization and other management functions to be performed on data generated by one or more other domain applications 134.

Figure 3:
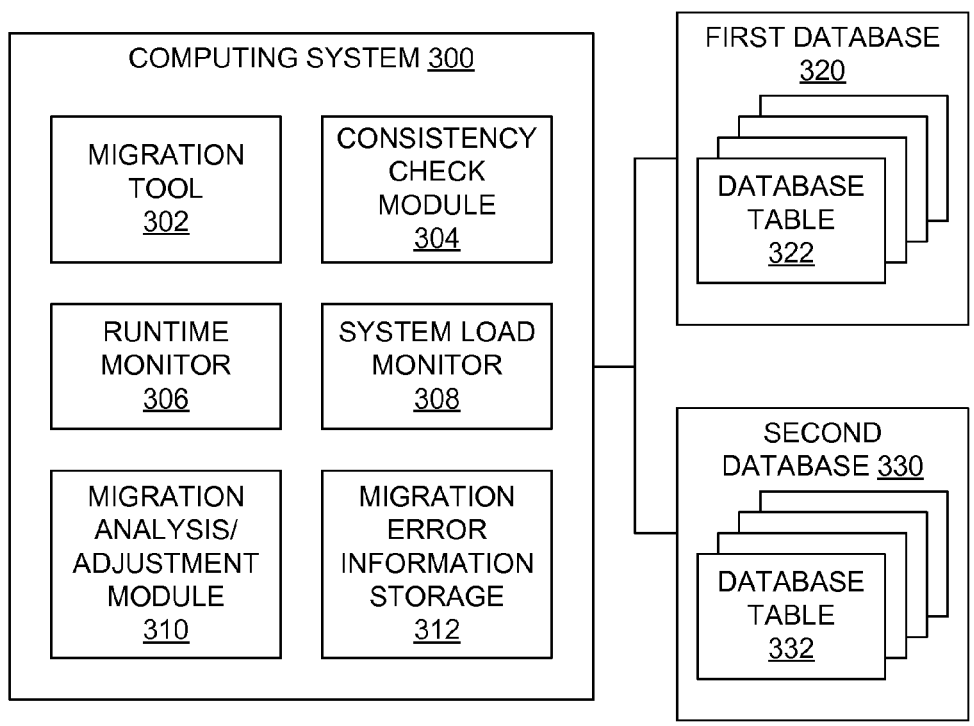
FIG. 3 is a block diagram of an example computing system employable to migrate data from one database to another.

FIG. 3 is a block diagram of an example computing system 300 configured to migrate database data from a first database 320 to a second database 330. In one example, the first database 320 and the second database 330 may represent separate databases stored as the database 130 of FIG. 1. However, the embodiments described herein are not limited to such an arrangement. As shown in FIG. 3, the first database 320 includes a plurality of database tables 322 which, during the migration process, are to be translated into another plurality of database tables 332 of the second database 330. In some examples, either or both of the database tables 322, 332 of the first database 320 and the second database 330 may be any kind of database table, including, but not limited to, standard or transparent tables, clustered tables, pooled tables, or any other data structure that may contain database data. In one example, clustered tables and pooled tables are tables that hold data and/or keys for more than one standard or transparent table.

Each of the first database 320 and the second database 330 may represent any database associated with any database application implemented on any computing system configured for such a purpose. In some examples, the second database 330 may be an updated version of the first database 320, a separate type of database from that of the first database 320, or the same database version as that of the first database 320 implemented on a different computing platform.

The computing system 300 of FIG. 3 is configured to perform the migration of database data from the first database 320 to the second database 330, as well as consistency checking of the migrated data to ensure that the data in the second database 330 represents the same data as that provided in the first database 320. In one implementation, one or more of either the application servers 126 or the database servers 128 of FIG. 1 may serve as the computing system 300 in some implementations. Other implementations, however, may employ a different hardware configuration or platform. In one example, the computing system 300 may be communicatively coupled with the first database 320 and the second database 330 by way of any communication means, including, but not limited to, a direct physical connection, a local-area network (LAN) (e.g., an Ethernet network or a Wi-Fi® network), a wide-area network (WAN) (e.g., the Internet), or any other communication connection capable of facilitating the reading and writing of data in the first database 320 and the second database 330 by the computing system 300.

As depicted in FIG. 3, the computing system 300 may include a migration tool 302, a consistency check module 304, a runtime monitor 306, a system load monitor 308, a migration analysis/adjustment module 310, and migration error information storage 312. In one example, the cross-functional services 132 of FIG. 1 may include the modules 302-312, which are described in greater detail below. The computing system 300 may also include other modules not explicitly depicted in FIG. 3, or may include fewer modules than shown. Also, one or more of the modules 302-312 may be combined into fewer modules or separated into a greater number of modules. Further, the computing system 300 may include other components, such as one or more processors for executing the modules 302-312, a memory device or system for storing the instructions for the modules 302-312, a communication interface, a power supply, and the like, but such components are not explicitly depicted in FIG. 3 to simplify the following discussion.

In some embodiments, the computing system 300 may execute any one or more of the modules 302-312 via one or more processes to allow simultaneous, concurrent, parallel, or otherwise overlapping execution of various tasks, such as data migration, consistency checking, and other functions performed by the computing system 300. In some examples, as described in greater detail below, several portions of the first database 320 may be migrated to the second database 330 concurrently, possibly along with at least some consistency checking, in order to expedite the migration process.

The migration tool 302 of the computing system 300 may include one or more separate tools for migrating one or more portions of the first database 320 to the second database 330. The migration tool 302 may, for example, read one or more database tables 322, or portions thereof, perform any possible conversion of that data for compatibility with the second database 330, and store the converted data to the second database 330. In some examples, the migration may take the form of downtime migration (in which all, or at least large sections, of the first database 320 is migrated to the second database 330 during "downtime," when the customer is prohibited from accessing the database 320), incremental migration (in which data is migrated during "uptime," while the customer has access to the data in the first database 320, and then any data in the first database 320 that the customer has changed may then be transferred to the second database 330 during a brief downtime), or any other form of migration, or combinations thereof.

In some examples, the migration tool 302 may segment database tables 322 or packages of multiple database tables 322 into portions that each of multiple processes executing on the computing system 300 may migrate independently, thus possibly accelerating the migration process. More specifically, the first database 320 very often may include a few very large database tables 322, along with several thousand very small database tables 322. In such cases, the migration tool 302 may segment, via "table-splitting," the large database tables 322 among multiple processes while handling groups of the very small database tables 322 via a single process. As is described more fully below, the computing system 300 may monitor characteristics of the migration process during the migration to adjust aspects of the computing system 300 to more quickly and efficiently perform the current migration, as well as future database migrations.

In some examples, the migration process may involve the de-clustering and/or de-pooling of clustered database tables and or pooled database tables 322 in the first database 320 into standard or transparent database tables 332 of the second database 330, depending on, for example, whether the second database 330 supports the use of such non-standard tables.

The consistency check module 304 may perform consistency checking on at least portions of the second database 330 to help ensure that the data migrated to the second database 330 represents the same data stored in the first database 320. The consistency checking may take a number of forms, including, but not limited to, systematic checks, statistical checks, or some combination thereof. Systematic checks may include checks of at least one aspect of all database tables 332 of the second database 330, such as, for example, checking to ensure that all expected database tables 332 exist, that each database table 332 is structured appropriately, that each column of each database table 332 holds some content, and/or so on. Statistical checks, such as consistency checks driven by Monte Carlo methods, may employ random sampling or other computational methods to perform more specific checks on at least some of the database tables 332. For example, the consistency check module 304 may select a database table 332 at random, check if the selected database table 332 exists in the target (e.g., the second database 330), compare the structure of the selected database table 332 with its corresponding source database table 322 in the first database 320, randomly select a key and determine whether that key exists or not in both the selected database table 332 and its corresponding source database table 322, randomly select a row of the selected database table 332 and compare the contents of the selected row with the corresponding row of the associated source database table 322, and so on.

The consistency check module 304 may store information regarding issues or problems encountered during consistency checking in the migration error information storage 312. The migration error information storage 312 may include, for example, the type of error encountered (e.g., incorrect table structure, missing row or column, incorrect table value, etc.), the target database table 332 in question, any row and/or column identified with the error, the structure of the table in question, the overall type of migration being performed (e.g., the type of each of the first database 320 and the second database 330), an identity of the migration tool 302 (and possibly version number) employed to migrate the table in question, the type of computing system 300 employed for the migration, the operating system (OS) of the computing system 300, whether incremental migration was used on the table in question, whether any de-clustering or de-pooling was involved in the migration of the table, whether any table-splitting was involved in the migration (and, if so, where in the table splits occurred), and so on.

Also possibly included in the migration error information storage 312 may be error information regarding errors encountered during customer use of the second database 330, either during or after the migration process. This information may include, for example, an identity of the database table 332 in which the error was encountered, the nature of the error (e.g., missing or incorrect row being accessed, missing or incorrect value stored, etc.), and so on. Such information may be reported, for example, by the particular database application employed by the customer, by the customer directly through an error reporting system, or other means, and then stored in the migration error information storage 312. Furthermore, in some examples, the computing system 300, or some other system, may filter the information regarding errors occurring during customer use that are unlikely to have been caused by the migration process. Such information may be removed from, or ignored in, the migration error information storage 312, or such information may be prevented from being stored in the migration error information storage 312. For example, if a database error reported during customer use involves data that was previously proven to be migrated correctly from the first database 320 to the second database 330, such information may be filtered from the migration error information storage 312.

While FIG. 3 depicts the migration error information storage 312 as being located within the computing system 300, the migration error information storage 312 may be located in a system external to the computing system 300 of FIG. 3, such as a centrally-located database or data depository accessible by multiple computing systems 300 performing various migrations of other databases not explicitly shown in FIG. 3.

The runtime monitor 306 of the computing system 300 may monitor the processing time or execution time of each of one or more processes during the migration process. For example, each process may be configured to migrate a particular database table 322, some portion thereof, or multiple such database tables 322 of the first database 320 to the second database 330. The runtime monitor 306 may measure the processing time for each of the processes, when migrating and/or consistency checking a particular database table 332, based on any suitable metric, such as, for example, seconds or fractions thereof, processing clock cycles of the computing system 300, and so forth. Such monitoring may occur continually, periodically, or in some other manner.

Also during the migration of the first database 320 to the second database 330, the system load monitor 308 may monitor the load on the computing system 300 resulting from the migration. The load on the computing system 300 may be measured in any of several different ways, including, but not limited to, the load on the one or more processors (e.g., central processing units (CPUs)) of the computing system 300 (such as in terms of percentage of total capacity, for example), the load on the memory of the computing system 300 (such as in terms of, for example, percentage of available memory used), the load on the input/output (I/O) system of the computing system 300 to access the first database 320 and the second database 330 to perform the migration (such as, for example, the percentage of the I/O system bandwidth consumed by the migration), and the load on a communication network employed by the computing system 300 to access the first database 320 and the second database 330 to perform the migration (such as, for example, by determining the amount of network bandwidth the migration consumes). Other methods or metrics for determining the load of the migration process (possibly including any consistency checking as well) may be employed in other implementations.

The migration analysis/adjustment module 310 may receive the information provided by the runtime monitor 306 (e.g., the processing time or execution time of each of the processes on the computing system 300 engaged in the migration and/or consistency checking tasks) to adjust segmentation of at least some of the database data of the first database 320 being migrated. In one example, the migration analysis/adjustment module 310 may segment at least one portion of database data, such as a database table 322, into multiple segments based on the monitoring of the processing time. Each of the multiple segments may then be migrated independently via a separate process executing on the computing system 300. Such segmentation may involve, for example, splitting a database table 322, or portion thereof, according to key values so one process may migrate some rows of the database table 322 to a corresponding database table 332 of the second database 330, while another process may migrate other rows of the source database table 322. In another example, a database table package including multiple database tables 322 may be split into multiple individual database tables 322, with a plurality of processes migrating the database tables 322 to the second database 330. Further, one or more of the constituent database tables 322 may be further split (e.g., according to key ranges) for migration by separate processes, as discussed above.

The migration analysis/adjustment module 310 may readjust the segmentation periodically during the migration based on new information from the runtime monitor 306, and may initially provide a segmentation scheme for a subsequent migration of database data involving the same or different databases based on processing the timing information received during the current migration.

The migration analysis/adjustment module 310 may also receive the information generated by the system load monitor 308 (e.g., the load imposed on the computing system 300 as a result of the migration and/or consistency checking) and adjust the number of processes being executed on the computing system 300 to optimize or maximize processing speed and/or throughput. In one example, the migration analysis/adjustment module 310 may compare the measured load from the system load monitor 308 to some predetermined threshold. If the measured load is below the threshold, the migration analysis/adjustment module 310 may initiate more processes to handle more migration and/or consistency checking tasks in parallel. If, instead, the measured load exceeds the threshold, fewer parallel processes may execute at any one time to reduce the load. In one example, the threshold may represent the load at which the migration and/or consistency checking throughput is reduced or at least constant in response to a further increase in the number of concurrent processes.

As with the segmentation adjustment discussed above, the migration analysis/adjustment module 310 may readjust the number of concurrent or parallel processes periodically during the migration based on new information from the system load monitor 308, and may provide an initial number of processes for a subsequent migration of database data involving the same or different databases based on loading information received during the current migration.

Based on the operation of the migration analysis/adjustment module 310 to optimize both the number of processes and/or the splitting of database tables 322 and/or database table packages, the overall execution time of the migration and/or consistency checking operations may be reduced, thus reducing the amount of potential downtime the customer experiences.

Specifically with respect to consistency checking, due to time constraints commonly imposed on the migration process, consistency checks of every aspect of every database table 332 of the second database 330 are not practical. In some examples, however, the migration analysis/adjustment module 310 may employ consistency check results, customer error reports, and possibly other information to focus future consistency checks for the current and other migrations on "issue hot spots" corresponding to those problems or issues that were previously identified. Moreover, the migration analysis/adjustment module 310, via the consistency check module 304, may add particular types of tests or checks and/or omit previously used types of checks to address the discovered issues. This focusing and adapting of future consistency checks may render the consistency checking process more productive and efficient. Further, the same consistency check results, customer error reports, and possibly other information may be employed to revise or update the migration tool 302 to reduce or eliminate the various issues or problems the consistency check module 304 encounters.

For example, if information from the migration error information storage 312 indicates that a particular row of a migrated database table 332 is missing, and that the database table 332 was split into multiple portions for processing by parallel processes, the migration analysis/adjustment module 310 may cause the consistency check module 304 to implement a greater number of consistency checks involving split database tables.

In another example, if the migration error information storage 312 indicates that a particular row of a migrated database table 332 is missing, and that the table was migrated incrementally, the migration analysis/adjustment module 310 may analyze other information from the migration error information storage 312 regarding the error, such as whether the missing row was the subject of a customer deletion, insertion, or update access in the first database 320 after the migration. Depending on this analysis, the migration analysis/adjustment module 310 may then determine that incrementally-updated database tables 332 may constitute an issue hot-spot that may benefit from more consistency checking.

In yet another example, if, according to the migration error information storage 312, the structure of a migrated database table 332 in the second database 330 does not match its corresponding database table 322 of the first database 320, and the table 332 was de-clustered or de-pooled from a clustered or pooled database table 322, the migration analysis/adjustment module 310 may cause the consistency check module 304 to implement more consistency checks for de-clustered tables that are configured to discover such errors. In such examples, the migration error information storage 312 may also include the structures of the source (pooled or clustered) database table 322 and the associated de-clustered (transparent) database table 332, which the migration analysis/adjustment module 310 may further analyze to focus consistency checks on those migrated de-clustered or de-pooled database tables 332 that more closely resemble the migrated database table 332 in which the error was discovered.

In each of these examples, the migration analysis/adjustment module 310 may adjust the consistency checking for the current migration, and for subsequent migrations, whether the same or different databases are involved, whether the same or different computing systems 300 are employed for the migration, whether the same or different customer is involved, and so on.

In some implementations, the migration analysis/adjustment module 310 may further employ information in the migration error information storage 312 indicating the type of databases (and possibly versions) involved in the migration, the particular computing system 300 used for the migration, the type of migration tool 302 used, the particular type of database table 322 being migrated, and other factors to determine the appropriate distribution of consistency checks (possibly including either or both systematic and statistical checking) among the migrated database tables 332.

In some examples, the consistency check module 304 may also perform some level of regression consistency checking to help ensure that aspects of the migration process, as performed by the migration tool 302, that were not problematic in the past continue to operate correctly, while determining whether aspects of the migration that generated errors or other issues are no longer doing so. In some examples, by focusing consistency checking on hot-spot issues, the consistency check module 304, using input from the migration analysis/adjustment module 310, may expend more time and resources on regression checking and similar efforts.

Further, in some embodiments, the migration analysis/adjustment module 310 may cause the consistency check module 304 to reduce or eliminate certain types of consistency checks, such as those directed toward migration operations that are not or will not be employed in the current or subsequent migration. More specifically, the migration analysis/adjustment module 310 may cause the consistency check module 304 to omit checking for inconsistencies that can only occur from the execution of certain migration algorithms that are not to be employed in the migration tool 302. For example, consistency checking specifically intended for de-clustered or de-pooled tables may only be performed if such conversions actually took place during the migration. Similarly, checking for missing rows in the migrated database tables 332 may only be appropriate for tables which were migrated after being split.

Figure 4:
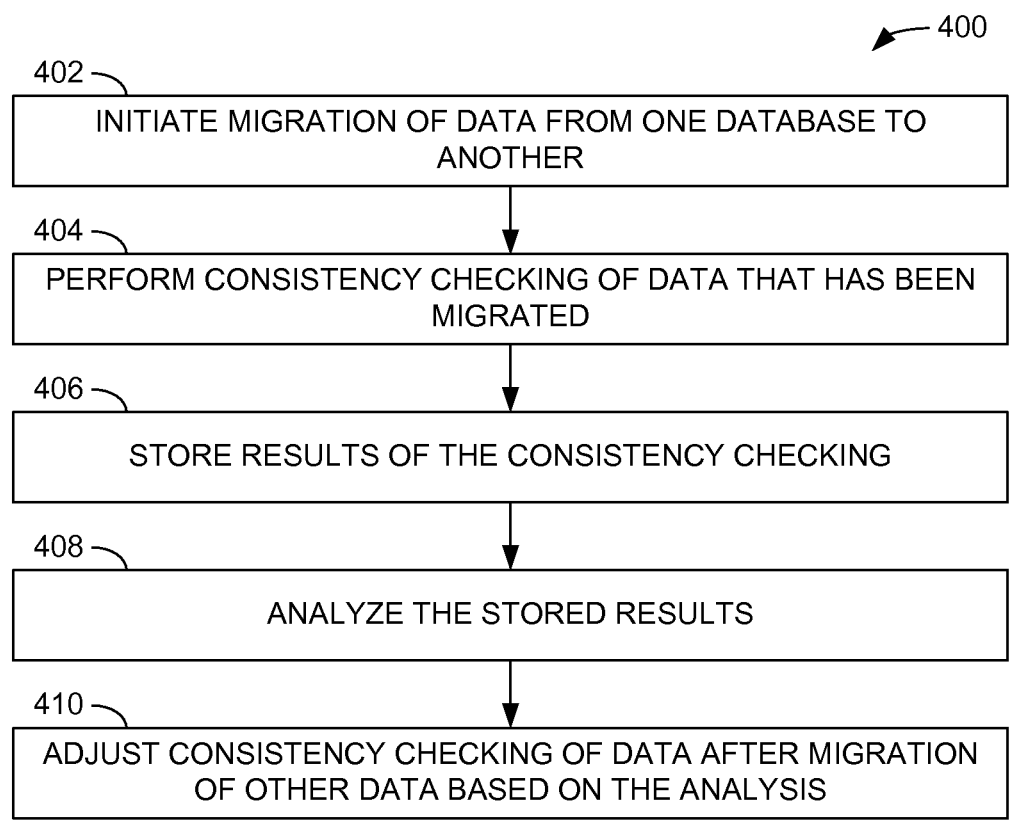
FIG. 4 is a flow diagram illustrating an example method of migrating data from one database to another.

FIG. 4 is a flow diagram illustrating an example method 400 of migrating data from one database to another. While the various operations of the method 400 are described in reference to the computing system 300 of FIG. 3, other devices or systems may be employed to perform the method 400 in other embodiments.

In the method 400, the computing system 300 initiates migration of data from the first database 320 to the second database 330 (operation 402). For those portions of the first database 320 that have already been migrated, the computing system 300 may perform consistency checking thereon (operation 404). The computing system 300 may perform the consistency checking while migration of other portions of the first database 320 to the second database 330 is still ongoing, or after the entire migration of the data from the first database 320 to the second database 330 has been completed. In addition, multiple processes may be employed for either or both of the migration and consistency checking operations, as discussed above. The computing system 300 may store the results of the consistency checking (operation 406) in the migration error information storage 312. In some examples, the migration error information storage 312 may also store error information generated from customer use of the second database 330 and/or other migrated databases. The computing system 300 may then analyze the stored information (operation 408) to determine hot-spot areas or types of migration which may benefit from additional or altered consistency checking, and then adjust the consistency checking on other migrated data based on that analysis (operation 410). Such adjustment may occur for the current migration and/or subsequent migrations. In some examples, the migration analysis/adjustment module 310 may receive human input regarding analysis of the migration error information storage 312 and the resulting types of systematic or statistical consistency checks to be performed in subsequent migrations.

While the operations 402 through 410 of the method 400 of FIG. 4 are shown in a specific order, other orders of operation, including possibly concurrent or repeated execution of at least portions of one or more operations, may be possible in some implementations of method 400, as well as other methods discussed herein. For example, the migration initiated in operation 402 may run concurrently with the consistency checking of the database that have already been migrated (operation 404). Similarly, the consistency checking of the current migration may be adjusted (operation 410) while the migration (operation 402) and consistency checking (operation 404) of the same database continue.

Figure 5:
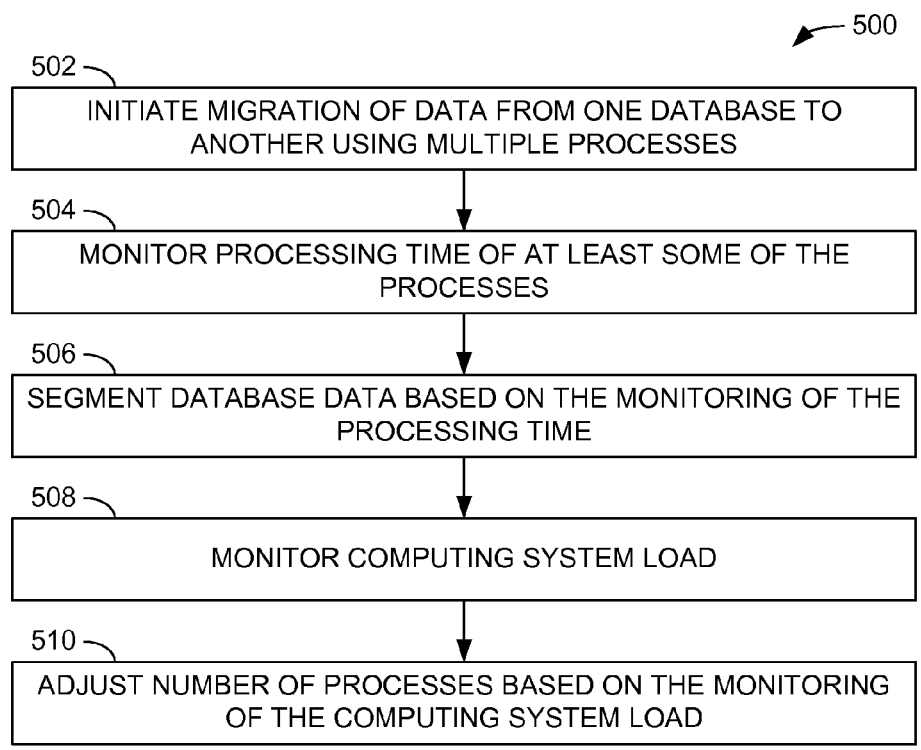
FIG. 5 is a flow diagram illustrating another example method of migrating data from one database to another.

FIG. 5 is a flow diagram illustrating another example method 500 of migrating data from one database to another, this time focusing on reducing the overall length of time consumed by the migration and associated consistency checking. In the method 500, the computing system 300 initiates migration of data from one database to another using multiple concurrent, parallel, or simultaneous processes (operation 502). During migration, the computing system 300 may monitor processing time of at least some of the processes (operation 504), as described above. Based on the monitoring of the processing time, the database data to be migrated may be segmented into multiple portions (operation 506) for migration and/or consistency checking by separate processes. As described in detail earlier, the computing system 300 may also monitor the load on the computing system 300 (operation 508) by the migration and/or consistency checking, and then adjust the number of processes used based on that monitoring (operation 510). In some embodiments, either one or the other of the monitoring operations 504, 508 and associated segmentation/adjustment operations 506, 510 may be employed.

In yet other examples, the computing system 300, during its migration and consistency checking tasks, may implement both the method 400 of FIG. 4 and the method 500 of FIG. 5 simultaneously. Further, the adjustment of the consistency checking (operation 410), the segmentation of database data (operation 506), and the adjustment of the number of processes employed (operation 510) may be provided for the current migration of methods 400, 500, and/or for a subsequent migration. In one example, the computing system 300 may undertake one or more test migrations to develop the types of consistency checks to perform, the initial segmentation of database tables 322, and/or the initial number of processes for the actual migration to follow involving the same databases 320, 330. In other examples, information from multiple database migrations, at least some involving database migrations involving various database 320, 330 types, computing systems 300, customer data sets, and the like, may be used to generate the initial consistency checks, database table 322 segmentation, and number of processors for a subsequent database migration.

Figure 6:
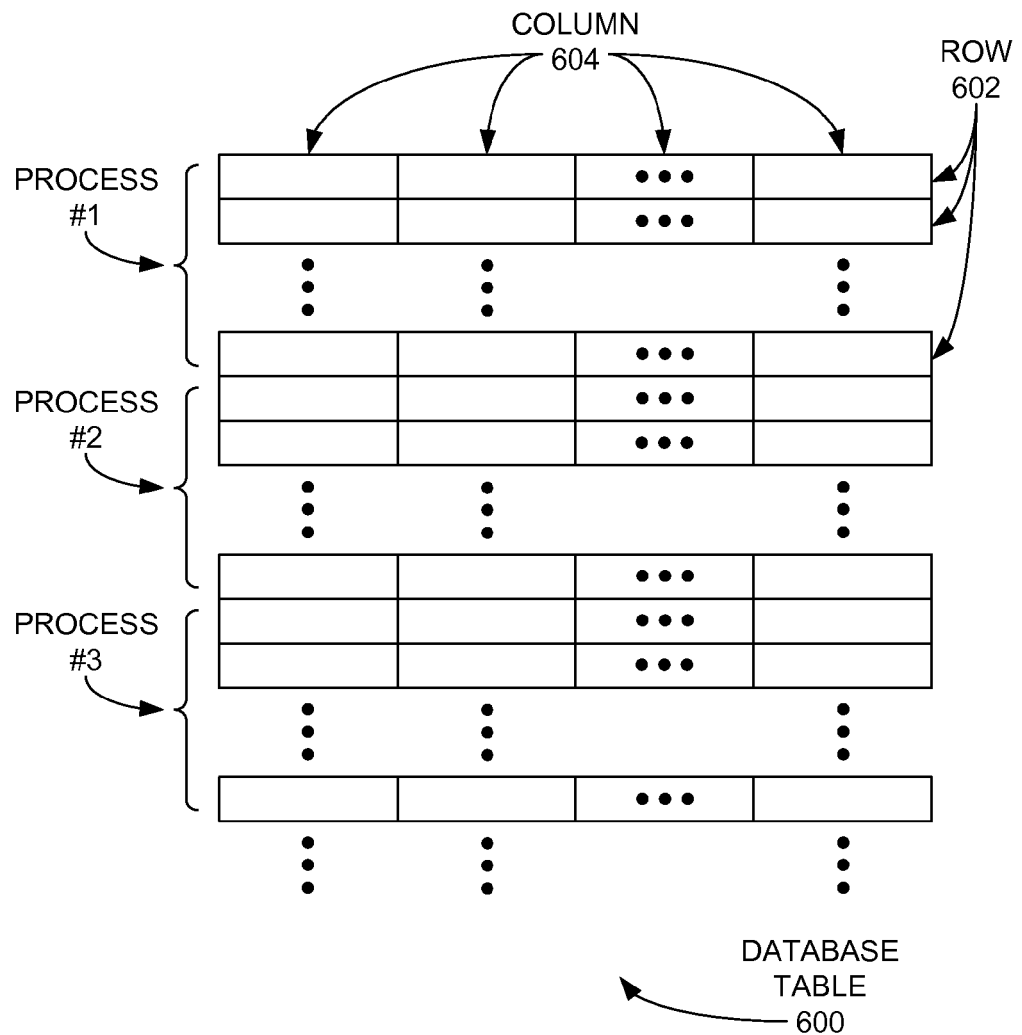
FIG. 6 is a graphical representation of a database table segmented for processing by multiple separate processes.

FIG. 6 is a graphical representation of a database table 600 segmented for processing by multiple separate processes, as mentioned above. In this example, the database table 600 includes multiple rows 602 and multiple columns 604. In some implementations, each row 602 is identified by a particular key, which may be stored in one or more columns 604 or fields of that particular row 602. Other fields or columns 604 of each row 602 may include data accessible by the key associated with its row 602. Presuming the database table 600 (e.g., on the order of several thousand rows 602), the computing system 300 may segment the database table 600 into several sections of multiple rows 602 each, assigning each segment to a different (possibly parallel) process for migration to a second database.

As a result of at least some of the embodiments described above, feedback from previous database migrations, such as, for example, error or issue information, processing time information, and/or system load information, may facilitate faster, more efficient, and less error-prone future database migrations. Additionally, such embodiments, when implemented over multiple iterations, are likely to result in continuing migration performance in terms of both migration speed and consistency.

Figure 7:
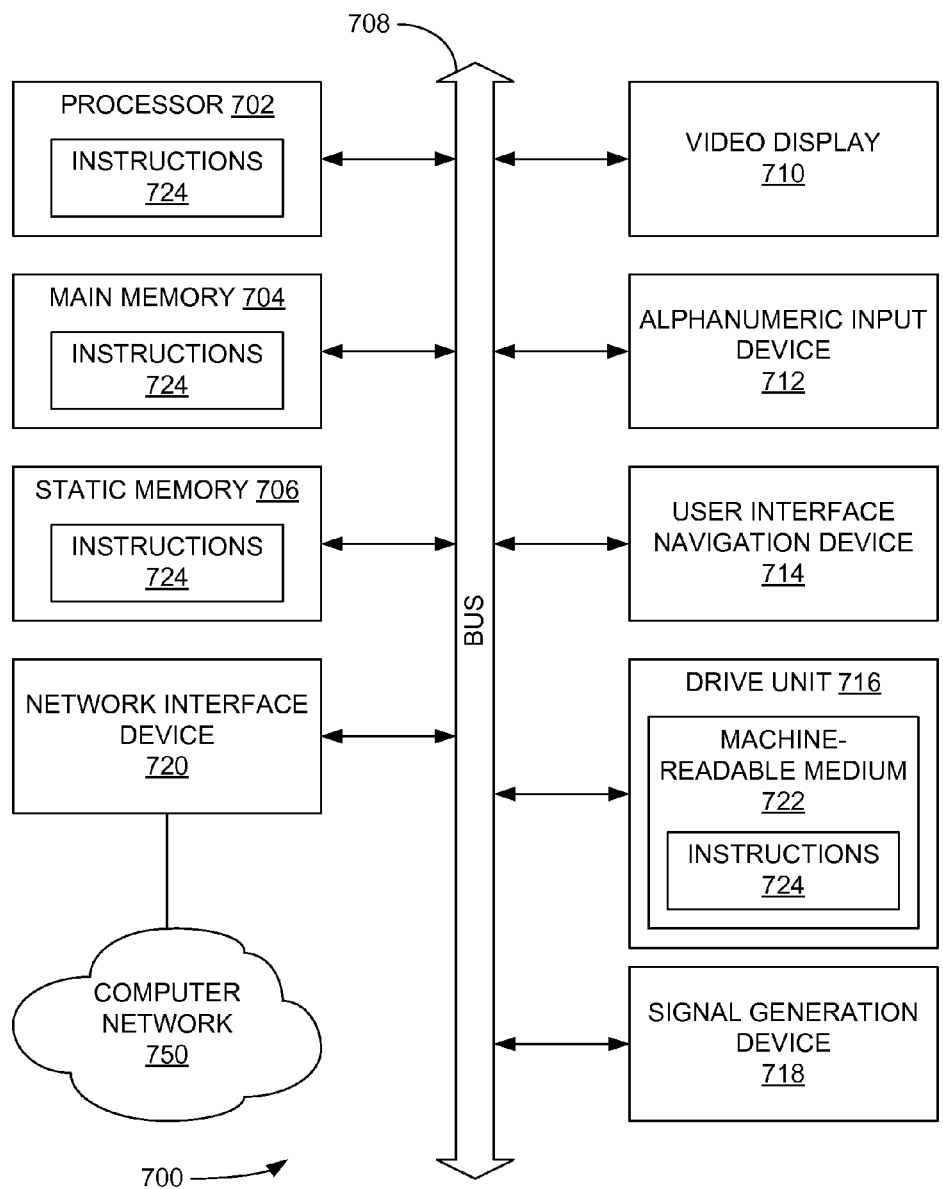
FIG. 7 is a block diagram of a machine in the example form of a processing system within which may be executed a set of instructions for causing the machine to perform any one or more of the methodologies discussed herein.

FIG. 7 depicts a block diagram of a machine in the example form of a processing system 700 within which may be executed a set of instructions 724 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions 724 (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 700 includes a processor 702 (e.g., a central processing unit (CPU), a graphics processing unit (GPU), or both), a main memory 704 (e.g., random access memory), and static memory 706 (e.g., static random-access memory), which communicate with each other via bus 708. The processing system 700 may further include video display unit 710 (e.g., a plasma display, a liquid crystal display (LCD), or a cathode ray tube (CRT)). The processing system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704, the static memory 706, and/or within the processor 702 during execution thereof by processing system 700, with the main memory 704, the static memory 706, and the processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 702 that is configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine but deployed across a number of machines. In some example embodiments, the processors 702 may be located in a single location (e.g., within a home environment, within an office environment, or as a server farm), while in other embodiments, the processors 702 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of database migration, the method comprising:
   initiating, on a computing system, a first migration of first database data from a first database to a second database, the first migration being performed by a plurality of concurrent processes;
   monitoring, during the first migration, processing time of at least some of the concurrent processes;
   segmenting, during the first migration, at least one portion of the first database data being migrated by one of the concurrent processes into multiple segments based on the monitoring of the processing time, wherein each of the multiple segments is to be migrated by a separate one of the concurrent processes;
   monitoring, during the first migration, a load on the computing system; and
   adjusting, during the first migration, a number of the concurrent processes performing the first migration based on the monitoring of the load on the computing system.

2. The method of claim 1, wherein the segmenting of the at least one portion of the first database data comprises splitting at least one of a database table into multiple database segment, and splitting a package of database tables into multiple database tables.

3. The method of claim 1, wherein the monitoring of the load on the computing system comprises monitoring at least one of processor load, memory load, input/output load, and communication network load.

4. The method of claim 1, further comprising:
   initiating a second migration of second database data, the second migration being performed by a plurality of second concurrent processes, wherein the second database data is segmented based on the monitoring of the processing time during the first migration, and wherein a number of the second concurrent processes is based on the monitoring of the load during the first migration.

5. The method of claim 1, wherein the plurality of concurrent processes also perform consistency checking of at least some of the first database data after being migrated from the first database to the second database.

6. The method of claim 5, wherein the plurality of concurrent processes perform at least some of the consistency checking during the first migration.

7. The method of claim 5, wherein at least some of the consistency checking is performed after the first migration.

8. The method of claim 5, wherein the consistency checking comprises at least one of systematic checking of each database table migrated to the second database, and statistical checking of at least one selected database table migrated to the second database.

9. The method of claim 5, further comprising:
storing results of the consistency checking;
analyzing the stored results of the consistency checking; and
initiating a second migration of second database data, wherein a plurality of second concurrent processes perform a second consistency checking of at least some of the second database data, the second consistency checking being based on the analyzing of the stored results of the consistency checking of the first database data.

10. The method of claim 9, the second consistency checking being performed on at least one aspect of the second migration shared with the first migration that exhibited an error represented in the stored results of the first consistency checking.

11. The method of claim 1, further comprising:
storing information of errors encountered during customer use of the second database;
analyzing the stored information; and
initiating a second migration of second database data, wherein a plurality of second concurrent processes perform a second consistency checking of at least some of the second database data, the second consistency checking being based on the analyzing of the stored information.

12. The method of claim 11, further comprising:
identifying portions of the information of errors encountered during customer user of the second database that are related to the first migration;
the analyzing of the stored information being based on the identified portions of the information.

13. A computer-readable storage medium comprising instructions that, when executed by at least one processor of a computing system, cause the computing system to perform operations comprising:
migrating first database data from a first database to a second database;
performing consistency checking of at least some of the first database data after being migrated from the first database to the second database;
storing results of the consistency checking;
analyzing the stored results of the consistency checking;
migrating second database data from a third database to a fourth database; and
performing second consistency checking of at least some of the second database data after being migrated from the third database to the fourth database, the second consistency checking being based on the analyzing of the stored results of the consistency checking of the first database data.

14. The computer-readable storage medium of claim 13, the migrating of the first database data being performed by a plurality of concurrent processes executing on the computing system, the operations further comprising:
monitoring, during the migration of the first database data, processing time of at least some of the concurrent processes; and
segmenting, during the migration of the first database data, at least one portion of the first database data being migrated by one of the concurrent processes into multiple segments based on the monitoring of the processing time, wherein each of the multiple segments is to be migrated by a separate one of the concurrent processes.

15. The computer-readable storage medium of claim 13, the migrating of the first database data being performed by a plurality of concurrent processes executing on the computing system, the operations further comprising:
monitoring, during the migration of the first database data, a load on the computing system; and
adjusting, during the migration of the first database data, a number of the concurrent processes performing the migration of the first database data based on the monitoring of the load on the computing system.

16. A computing system comprising:
at least one processor; and
memory comprising instructions that, when executed by the at least one processor, cause the at least one processor to perform operations comprising:
initiating, on the computing system, a first migration of first database data from a first database to a second database, the first migration being performed by a plurality of concurrent processes;
monitoring, during the first migration, processing time of at least some of the concurrent processes;
segmenting, during the first migration, at least one portion of the first database data being migrated by one of the concurrent processes into multiple segments based on the monitoring of the processing time, wherein each of the multiple segments is to be migrated by a separate one of the concurrent processes;
monitoring, during the first migration, a load on the computing system; and
adjusting, during the first migration, a number of the concurrent processes performing the first migration based on the monitoring of the load on the computing system.

17. The computing system of claim 16, wherein the operations further comprise:
initiating a second migration of second database data, the second migration being performed by a plurality of second concurrent processes, wherein the second database data is segmented based on the monitoring of the processing time during the first migration, and wherein a number of the second concurrent processes is based on the monitoring of the load during the first migration.

18. The computing system of claim 16, wherein the concurrent processes also perform consistency checking of at least some of the first database data after being migrated from the first database to the second database.

19. The computing system of claim 18, wherein the operations further comprise:
storing results of the consistency checking;
analyzing the stored results of the consistency checking; and
initiating a second migration of second database data, wherein a plurality of second concurrent processes perform a second consistency checking of at least some of the second database data, the second consistency checking being based on the analyzing of the stored results of the consistency checking of the first database data.

20. The computing system of claim 18, wherein the operations further comprise:

storing information of errors encountered during customer use of the second database;
analyzing the stored information; and
initiating a second migration of second database data, wherein a plurality of second concurrent processes perform a second consistency checking of at least some of the second database data, the second consistency checking being based on the analyzing of the stored information.

\* \* \* \* \*